(12) United States Patent
Kin et al.

(10) Patent No.: US 9,335,544 B2
(45) Date of Patent: May 10, 2016

(54) ELECTROSTATICALLY STEERABLE ACTUATOR

(71) Applicant: RIT Technologies Ltd., Tel Aviv (IL)

(72) Inventors: David Kin, Tel-Aviv (IL); Alex Shar, Rishon Letzion (IL); Moshe Medina, Haifa (IL)

(73) Assignee: RiT Wireless Ltd., Tel Aviv (IL)

( * ) Notice: Subject to any disclaimer, the term of this patent is extended or adjusted under 35 U.S.C. 154(b) by 162 days.

(21) Appl. No.: 13/838,515

(22) Filed: Mar. 15, 2013

(65) Prior Publication Data
US 2014/0268268 A1    Sep. 18, 2014

(51) Int. Cl.
```
G02B 26/08     (2006.01)
G02B 26/10     (2006.01)
G02B 26/12     (2006.01)
G02B 6/35      (2006.01)
```
(52) U.S. Cl.
CPC .............. *G02B 26/105* (2013.01); *G02B 6/357* (2013.01); *G02B 6/3584* (2013.01); *G02B 6/3564* (2013.01)

(58) Field of Classification Search
CPC ................ G02B 6/356; G02B 7/1821; G02B 2006/12104; G02B 26/08; G02B 6/357; G02B 6/3564; G02B 6/3584; B81B 2201/042; B81B 2201/045; B81B 2201/033; B81B 2203/0136; B81B 3/0051
USPC ....................... 359/200.6, 200.7, 200.8, 199.2
See application file for complete search history.

(56) References Cited

U.S. PATENT DOCUMENTS

| | | | | |
|---|---|---|---|---|
| 5,016,072 A * | 5/1991 | Greiff | ........................... | 257/418 |
| 5,097,354 A * | 3/1992 | Goto | ........................... | 359/212.1 |
| 5,673,139 A * | 9/1997 | Johnson | ........................ | 359/291 |
| 6,384,952 B1 * | 5/2002 | Clark et al. | ................. | 359/224.1 |
| 6,625,342 B2 * | 9/2003 | Staple et al. | ..................... | 385/18 |
| 6,641,273 B1 * | 11/2003 | Staker et al. | ................... | 359/876 |
| 6,649,987 B1 * | 11/2003 | Staker et al. | ................... | 257/417 |
| 6,657,759 B2 * | 12/2003 | Muller | ................. | B81B 3/0016 |
| | | | | 359/199.2 |
| 6,778,304 B1 * | 8/2004 | Muller | ....................... | 359/225.1 |
| 6,785,039 B2 * | 8/2004 | Wendland, Jr. | ................ | 359/290 |
| 6,791,235 B2 * | 9/2004 | Miller et al. | ................... | 310/311 |
| 6,825,967 B1 * | 11/2004 | Chong et al. | ................... | 359/290 |
| 6,925,710 B1 * | 8/2005 | Scalf et al. | ..................... | 29/847 |
| 7,095,545 B2 * | 8/2006 | Regan | ........................... | 359/290 |
| 7,643,196 B2 * | 1/2010 | Bernstein et al. | .......... | 359/224.1 |
| 7,715,077 B2 * | 5/2010 | Novotny | .................... | 359/200.6 |
| 7,965,431 B2 * | 6/2011 | Katoh | ................. | G02B 26/0841 |
| | | | | 359/198.1 |
| 8,089,672 B2 * | 1/2012 | Tinnemans et al. | ........ | 359/199.2 |
| 8,125,701 B2 * | 2/2012 | Yamaguchi et al. | ........ | 359/221.2 |
| 2002/0034024 A1 * | 3/2002 | Orcutt et al. | ................... | 359/846 |
| 2002/0071171 A1 * | 6/2002 | Greywall | ........... | G02B 26/0841 |
| | | | | 359/292 |
| 2002/0146200 A1 * | 10/2002 | Kudrle et al. | ................... | 385/18 |
| 2002/0164113 A1 * | 11/2002 | Rensing et al. | ................ | 385/18 |
| 2002/0167072 A1 * | 11/2002 | Andosca | ....................... | 257/620 |
| 2002/0181839 A1 * | 12/2002 | Brown et al. | .................. | 385/16 |
| 2002/0181851 A1 * | 12/2002 | Brown et al. | .................. | 385/18 |
| 2003/0169962 A1 * | 9/2003 | Rajan et al. | ..................... | 385/18 |

(Continued)

*Primary Examiner* — Bumsuk Won
*Assistant Examiner* — Collin X Beatty
(74) *Attorney, Agent, or Firm* — Pearl Cohen Zedek Latzer Baratz LLP

(57) ABSTRACT

An electrostatically steerable actuator includes a gimbaled platform. A central portion of a rear side of the platform extends outward from the platform. A diameter of the central portion is substantially smaller than a corresponding diameter of the platform. An array of electrodes faces the rear side of the platform to provide an adjustable electrostatic field for tilting the platform.

14 Claims, 8 Drawing Sheets

(56) References Cited

U.S. PATENT DOCUMENTS

| | | | |
|---|---|---|---|
| 2003/0189389 A1* | 10/2003 | Fernandez et al. | 310/309 |
| 2003/0214639 A1* | 11/2003 | Patel et al. | 353/98 |
| 2004/0061417 A1* | 4/2004 | Hwang | 310/324 |
| 2005/0013533 A1* | 1/2005 | Wiegele et al. | 385/18 |
| 2005/0139542 A1* | 6/2005 | Dickensheets et al. | 210/490 |
| 2005/0162765 A1* | 7/2005 | Hagelin et al. | 359/872 |
| 2007/0047113 A1* | 3/2007 | Davis et al. | 359/849 |
| 2008/0100899 A1* | 5/2008 | Shimokawa et al. | 359/225 |
| 2008/0310001 A1* | 12/2008 | Bernstein | 359/198 |
| 2009/0244676 A1* | 10/2009 | Uchiyama | G02B 26/101 359/225.1 |
| 2011/0013256 A1* | 1/2011 | Uchiyama et al. | 359/290 |
| 2011/0228367 A1* | 9/2011 | Lubianiker et al. | 359/199.2 |
| 2011/0292480 A1* | 12/2011 | Ma et al. | 359/199.4 |
| 2011/0310452 A1* | 12/2011 | Lin | 359/200.7 |
| 2012/0014642 A1* | 1/2012 | Hanneman et al. | 385/16 |
| 2012/0018898 A1* | 1/2012 | Ebefors et al. | 257/774 |
| 2012/0062973 A1* | 3/2012 | Medina et al. | 359/221.2 |
| 2012/0099176 A1* | 4/2012 | Zhou | 359/291 |
| 2012/0119324 A1* | 5/2012 | Jain et al. | 257/508 |
| 2012/0236379 A1* | 9/2012 | da Silva et al. | 359/200.8 |
| 2012/0281266 A1* | 11/2012 | Moidu | 359/225.1 |

* cited by examiner

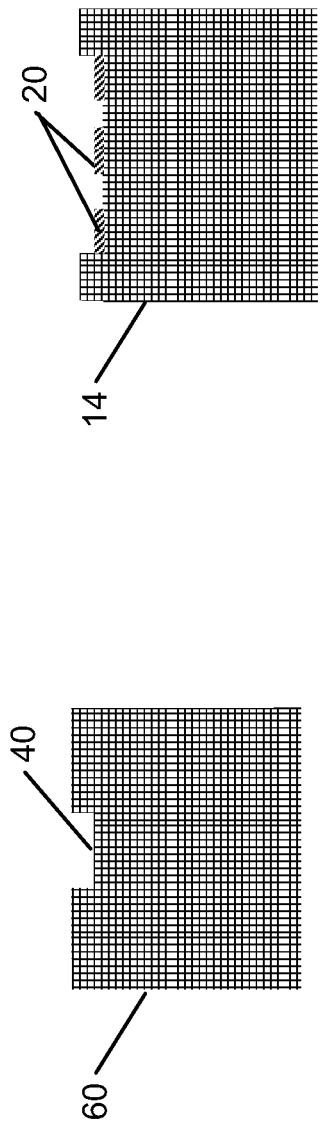
Fig. 6E
Fig. 6F
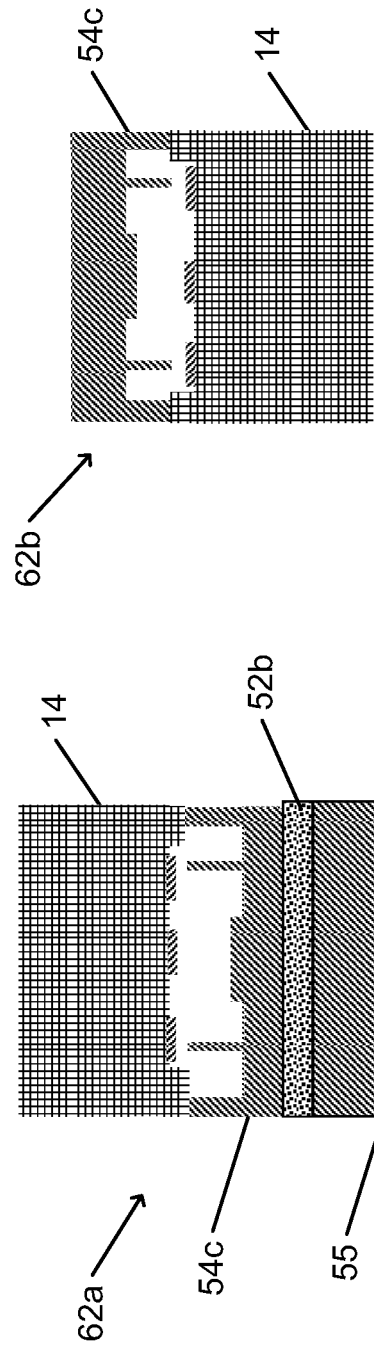
Fig. 6G
Fig. 6H

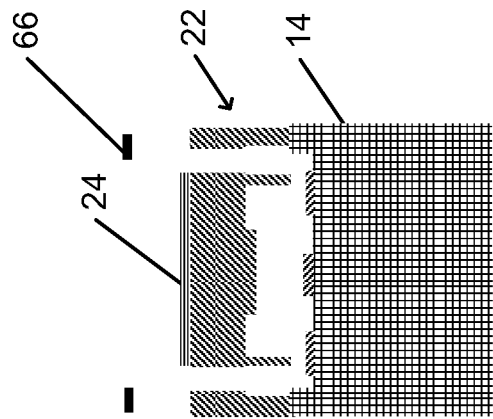
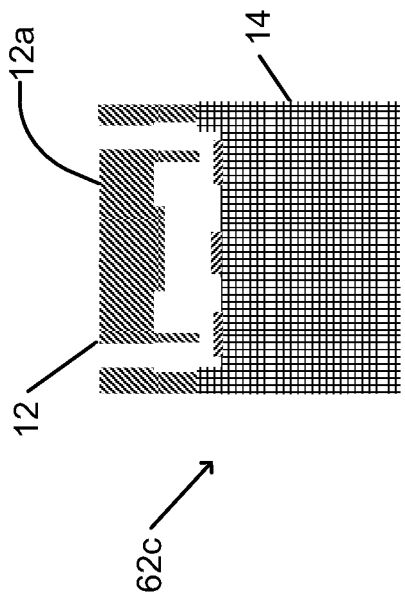

ELECTROSTATICALLY STEERABLE ACTUATOR

FIELD OF THE INVENTION

The present invention relates to actuators. More particularly, the present invention relates to an electrostatically steerable actuator.

BACKGROUND OF THE INVENTION

Scanning mirrors are useful in a variety of applications. Scanning mirrors may be used in scanning or projection devices to enable detection of light from a range of directions, or to enable projection of light into a range of directions.

In telecommunications, scanning mirrors may be useful in creation or maintenance of an optical communications link ("optical WiFi"). Such an optical communications link may enable wireless communications with increased privacy as compared with radio-based communications. For example, a static transceiver link device may be mounted at a fixed position, such as in a ceiling or wall. A moveable communication device (e.g., desktop or laptop computer, or other device with communications capability) is provided with a similar transceiver port (or attached device).

The moveable communication device may be placed within a region toward which a beam of the static transceiver link is aimed. However, in the absence of scanning capability, the moveable communication device would have to be placed sufficiently accurately so that the transceiver port of the moveable communication device is accurately aligned with the static transceiver link. Such accurate placement of the moveable communication device could be difficult or frustrating for many users. Furthermore, the moveable communication device may be intentionally or unintentionally moved during use and that would cause communication disruption.

However, equipping the static transceiver link, the moveable communication device, or both with scanning mirrors may enable creation and maintenance of the link. For example, the mirrors may be scanned (e.g., in a predetermined pattern) to change a direction of a transmitted beam or of a field of view of a detector until an optical communication link is established or restored. The mirror may be scanned in accordance with detected motion in order to maintain the optical communication link.

A mechanism useful for scanning the mirror may depend on various properties of the mirror, or on other factors. For example, in microelectromechanical systems (MEMS) technology (e.g., sub-millimeter sized mirrors), piezoelectric devices or materials (e.g., lead zirconate titanate—PZT) may be used to tilt the mirror. Control of such devices may be complex. Similarly, electrostatic forces may be applied to tilt such MEMS mirrors. However, electrostatic forces are typically much weaker (e.g., by a factor on the order of about one million) than the forces applied by piezoelectric devices. Scanning of larger mirrors may be effected by use of motors or similar devices.

The strength of electrostatic fields that are created to tilt a mirror may be limited by various constraints. For example, electrical fields in air may be limited by electrical breakdown considerations to below the dielectric strength of air. If the mirror tilts sufficiently such that a part of the mirror approaches an electrode, the mirror may continue to tilt in an unrestrained manner an edge of the mirror comes into contact with and sticks to the electrode.

SUMMARY OF THE INVENTION

There is thus provided, in accordance with some embodiments of the present invention, an electrostatically steerable actuator, the actuator including: a gimbaled platform, a central portion of a rear side of the platform extending outward from the platform, a diameter of the central portion being substantially smaller than a corresponding diameter of the platform; and an array of electrodes facing the rear side of the platform to provide an adjustable electrostatic field for tilting the platform.

Furthermore, in accordance with some embodiments of the present invention, a front surface of the platform includes a mirror.

Furthermore, in accordance with some embodiments of the present invention, the central portion is grooved.

Furthermore, in accordance with some embodiments of the present invention, the actuator includes a pillar to limit tilting of the platform.

Furthermore, in accordance with some embodiments of the present invention, the pillar is located on the rear side of the platform.

Furthermore, in accordance with some embodiments of the present invention, the pillar is configured to contact a region that is adjacent to the electrode array and that is electrically isolated from the electrode array when the platform tilts toward that region.

Furthermore, in accordance with some embodiments of the present invention, the electrically isolated region is surrounded by an electrode of the electrode array.

Furthermore, in accordance with some embodiments of the present invention, the platform and the central portion are substantially circular.

Furthermore, in accordance with some embodiments of the present invention, the diameter of the central portion is within a range of diameters equal to 40% to 60% of the diameter of the platform.

Furthermore, in accordance with some embodiments of the present invention, the diameter of the central portion is substantially equal to half the diameter of the platform.

Furthermore, in accordance with some embodiments of the present invention, the electrode array includes four electrodes.

Furthermore, in accordance with some embodiments of the present invention, the electrode array is circular and each electrode of the electrode array is substantially quadrant shaped.

Furthermore, in accordance with some embodiments of the present invention, the electrode array is located on a glass substrate.

Furthermore, in accordance with some embodiments of the present invention, a conductor of the electrode array is located within a recessed region.

Furthermore, in accordance with some embodiments of the present invention, the platform is connected to supporting structure via a torsion bar.

Furthermore, in accordance with some embodiments of the present invention, the actuator includes a gimbal ring surrounding the platform.

Furthermore, in accordance with some embodiments of the present invention, the gimbaled platform and the central portion are constructed from a single piece of a material.

Furthermore, in accordance with some embodiments of the present invention, the material includes silicon.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 6A through FIG. 6J schematically illustrate stages of production of a scanning mirror device incorporating an electrostatically steerable actuator, in accordance with an embodiment of the present invention.

DETAILED DESCRIPTION

Figure 1:
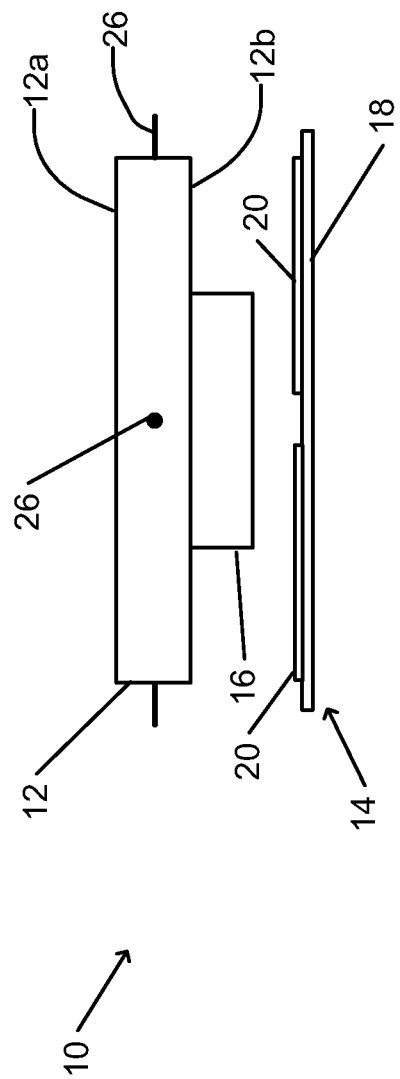
FIG. 1 schematically illustrates a cross-sectional view of an electrostatically steerable actuator in accordance with embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

An electrostatically steerable actuator may be used to tilt components, such as optical components. The actuator includes an assembly that includes an array of electrodes, and a gimbaled platform that cooperates with the electrode array assembly. Selective application of electrical charge to the electrodes of the array enables creation and controlling of an electrostatic field. The gimbaled platform may include dielectric material such that the platform may be tilted by application of the electrostatic field.

For example, a front side or face of the actuator platform may be metallized or silvered to form a reflecting surface or mirror. As another example, a light emitting diode or laser diode may be attached to the front side. Thus, tilting the actuator platform enables aiming or steering of the front side and any incorporated mirror or device.

The electrode array includes selectively electrically chargeable electrodes. The electrodes may be arrayed on a base to form an electrode unit. Each electrode is connected to a suitable charge source. For example, four electrodes may be arranged in four quadrants of a circular electrode array, or otherwise symmetrically arrange about a center of the array. Other configurations of electrodes are possible. Controlled application of electric charge to the electrodes creates an adjustable electrostatic field in the vicinity of the electrodes.

The gimbaled platform is mounted opposite the electrode array. (As used herein, a platform is gimbaled if pivoting, rotation, or tilting of the object is enabled about one or more axes.) A central portion of a rear side of the platform extends outward from the platform toward the electrode array. The diameter of the central portion is substantially smaller than a corresponding diameter of the platform. (As used herein, a diameter refers to a distance between opposite edges of an object through a center of the object, whether or not the object is circular. As used herein, two diameters of two different components of the object, such as the central portion and the platform, are considered to be corresponding diameters when the two diameters are parallel to one another.) The gimbaled platform includes dielectric structure such that an adjustable electrostatic field created by the electrode array applies an electrostatic force to the platform.

The gimbaled platform may be connected to surrounding structure (which may include one or more nested gimbal rings) by one or more torsion bars. The torsion bars apply a restoring force when the gimbaled platform is tilted from an equilibrium orientation (e.g., approximately parallel to a plane of the electrode array). Other structure (e.g., gimbal rings) may be similarly connected to surrounding structure by torsion bars.

The extended central portion of the platform may facilitate electrostatic steering of the platform in a controlled manner using an electrostatic field of minimal strength. For example, an electrostatically steerable actuator in accordance with embodiments of the present invention having a gimbaled platform with a diameter of about 5 millimeters may have a maximum tilt of about ±0.5° (for applied voltage of about 200 V). An electrostatically steerable actuator having a gimbaled platform with a diameter of about 1 millimeter may have a maximum tilt of about ±3°. An electrostatically steerable actuator having a gimbaled platform with a diameter greater than 5 millimeters may have a maximum tilt that is less than half a degree.

The extended central portion may extent close enough to the electrodes to enable electrostatic steering without generating an electrostatic field whose strength exceeds the dielectric strength of air.

The extended central portion may be grooved, or otherwise include cavities or hollow structure. In this manner, a mass of the extended central portion may be limited, while not significantly affecting electrostatic forces on the extended central portion or on the gimbaled platform. For example, limiting the mass may increase resistance of the central portion and the gimbaled platform to breakage or damage (e.g., when dropped or shocked).

The electrode array and gimbaled platform may be configured so as to eliminate uncontrolled tilt of the platform. Tilt may be defined in terms of a tilt angle. Tilt angle as used herein is defined as an angle between a normal to a plane representative of the platform and a normal to plane representative of the electrode array. For example, the representative plane may be defined as parallel to a flat platform surface or electrode array surface. The representative plane may be defined as parallel to a tangent surface through a center of a curved platform surface or electrode array surface.

An electrostatically steerable actuator in accordance with embodiments of the present invention is characterized by a maximum tilt angle. The maximum tilt angle is the largest tilt angle for a particular direction of tilt that physical constraints enable. (When the platform or additional structure of the actuator is not axially symmetric or circular, the maximum tilt angle may be different for different directions of tilt.) For example, in the absence of any other restraining structures, the maximum tilt angle would be equal to the tilt angle at which the platform meets the electrode array.

An electrostatically steerable actuator in accordance with embodiments of the present invention is also characterized by a critical angle, herein referred to as the snapdown angle, for a particular direction of tilt. When the angle of tilt of the platform is less than the snapdown angle, the platform may be reversibly tilted by adjustment of the electrostatic field. For example, the applied electrostatic field may first tilt the platform in one direction by a particular tilt angle. Changing the electrostatic field may then tilt the platform in another direction or by another tilt angle. However, when the angle of tilt of platform exceeds the snapdown angle, the applied electrostatic forces are strong enough to overcome any resisting forces. Thus, the platform may continue to tilt until the platform could tilt through the maximum tilt angle and come into contact with the electrode array ("snapdown"). Such a snapdown condition could impede further adjustment of platform tilt. The snapdown angle may be a function of various characteristics of the actuator. Such characteristics may include, for example, sizes or dimensions of components, distances between components, moments of inertia, rigidity or resistance to rotation, electrical field strength, dielectric constants, electrode shape, or other relevant characteristics. For example, in some configurations, the snapdown angle is approximately 40% of the maximum tilt angle.

An electrostatically steerable actuator in accordance with embodiments of the present invention may include structure to prevent the platform tilt from exceeding the snapdown angle. For example, raised bosses, ridges, or pillars (hereinafter referred to as pillars) may extend from the rear side of the platform, from a base of the electrode array, from another surrounding structure, or from a combination of the above. The pillars are configured to prevent the platform from tilting in one or more tilt directions through an angle greater than a modified maximum tilt angle that is smaller than the snapdown angle for that tilt direction. Thus, in each such tilt direction, the modified maximum tilt angle does not exceed the snapdown angle.

For example, each pillar that extends from the rear side of the platform may be positioned laterally to the extended central portion. Each pillar may be positioned to contact an electrically isolated region of the electrode unit. An isolated region may be adjacent to the electrode array. The electrode unit may include conducting pads that are electrically isolated from the electrodes and that are arranged among the electrodes. The electrically isolated pads may be grounded or may be have a floating voltage.

FIG. 1 schematically illustrates a cross-sectional view of an electrostatically steerable actuator in accordance with embodiments of the present invention.

Electrostatically steerable actuator 10 includes gimbaled platform 12 and electrode unit 14.

Electrode unit 14 includes a plurality of electrodes 20 mounted on electrode base 18. Each electrode 20 is separately connectable via a conducting lead (e.g., wire, strip, deposited line, or other conductor) to a charge generator (e.g., of a steering control unit or other controller that is operable to steer electrostatically steerable actuator 10). In this manner, each electrode may be separately and adjustably charged to produce an adjustable electrostatic field.

Electrodes 20 may be variously shaped and arranged in an array so as to produce an electrostatic field that is capable of tilting gimbaled platform 12. For example, each quadrant of a circular electrode unit 14 may be occupied by a quadrant-shaped electrode, or by a plurality of electrodes.

Electrode base 18 includes conducting material so as to electrically insulate electrodes 20 (as well as their conducting leads) from one another.

Gimbaled platform 12 is tiltable about one or more tilt axes 26. For example, tilt axes 26 may represent axes of one or more gimbal rings. Tilt axes 26 may include a torsion bar that applies a restoring force to reduce a tilt of gimbaled platform 12 when no electrostatic field is applied.

Front side 12a of gimbaled platform 12 may include an optical component or other component that is to be aimed or steered. For example, front side 12a may be metallized (e.g., aluminized) to form a reflecting surface of a mirror, or another component (e.g., a light-emitting diode or diode laser). Front side 12a may be flat, or may be curved (e.g., concave or convex).

A central portion of rear side 12b of gimbaled platform extends out in the form of central projection 16. Gimbaled platform 12 is mounted opposite electrode unit 14 such that central projection 16 is closer to electrodes 20 than is rear side 12b of gimbaled platform 12.

Central projection 16 may be a solid unit or may include hollowed out regions or grooves. Inclusion of the grooves enables reducing the mass of central projection 16 and of gimbaled platform 12 as a whole. Reducing the mass of gimbaled platform 12 may increase its resonance frequency. For example, an increased resonance frequency may increase rigidity and susceptibility to damage of a mirror on front surface 12a of gimbaled platform 12.

In accordance with some embodiments of the present invention, central projection 16 may have a diameter that is 40% to 60% of the diameter of gimbaled platform 12. For example, in some cases, the diameter of central projection 16 may be approximately equal to half of the diameter of gimbaled platform 12. The thickness of central projection 16 may be approximately equal to the thickness of gimbaled platform 12.

Electrostatically steerable actuator 10 may be incorporated into a device with a controllable tilt. For example, electrostatically steerable actuator 10 may be incorporated into a scannable mirror. When incorporated into a scannable mirror, a reflecting surface may be attached to or coated on front side 12a of gimbaled platform 12. For example, a scannable mirror may be incorporated into a telecommunications device.

Figure 2:
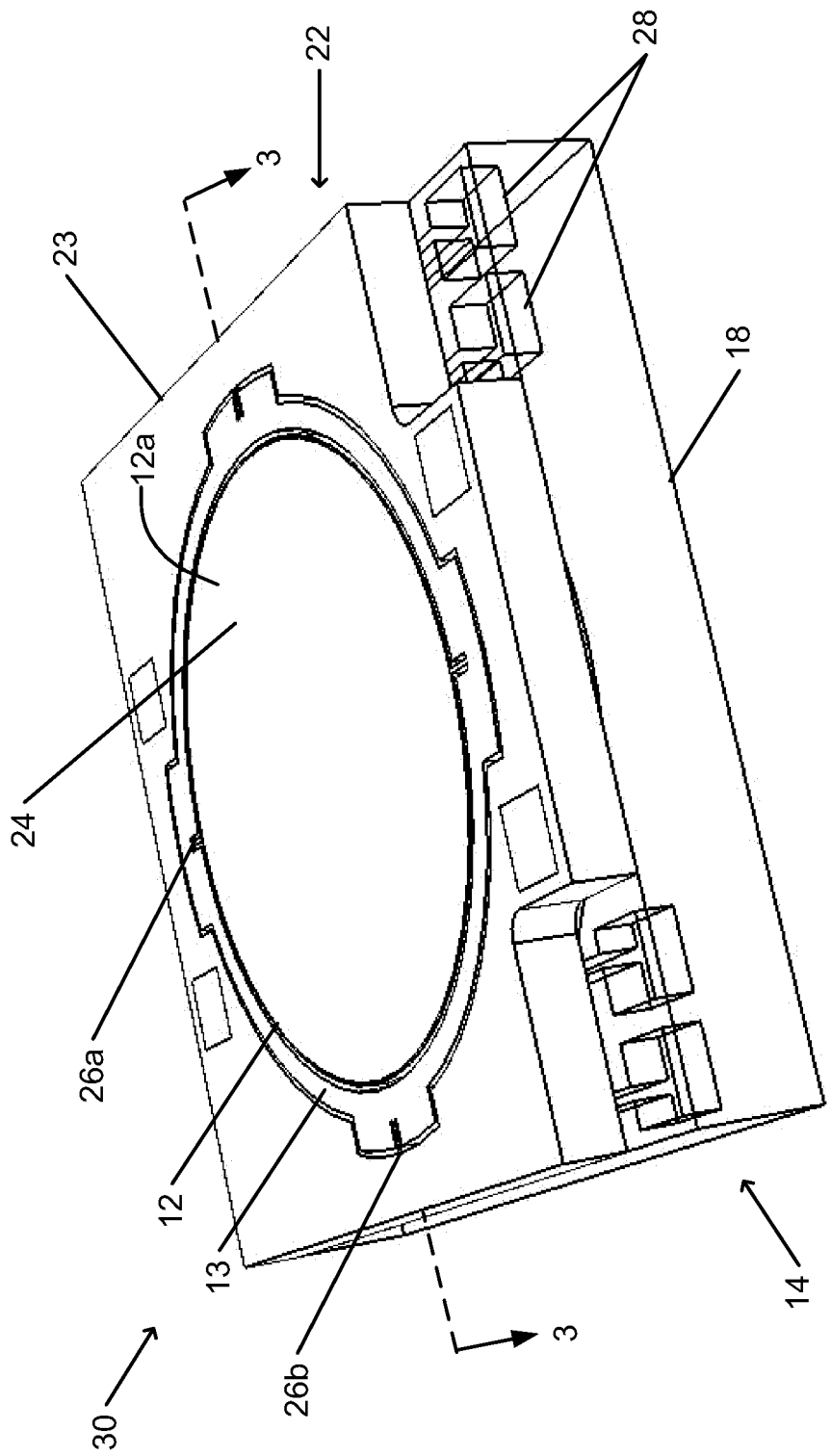
FIG. 2 shows a scannable mirror that incorporates an electrostatically steerable actuator in accordance with embodiments of the present invention.
Figure 3:
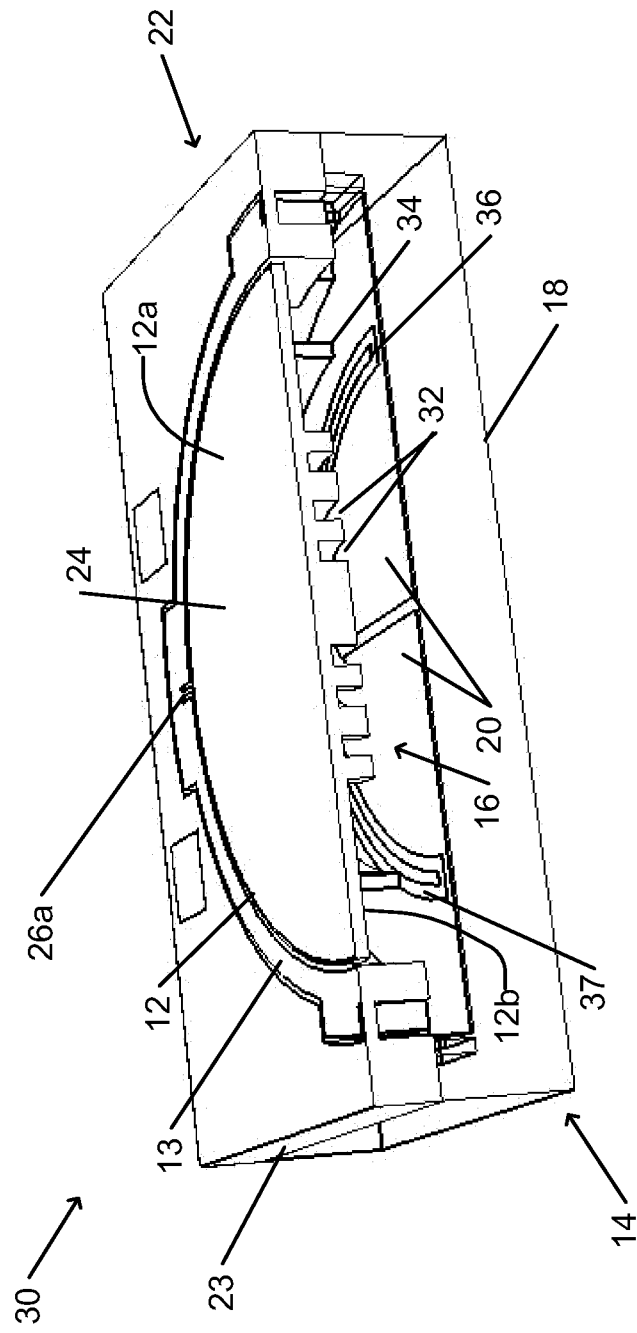
FIG. 3 shows a cross section through the scannable mirror shown in FIG. 2.

FIG. 2 shows a scannable mirror that incorporates an electrostatically steerable actuator in accordance with embodiments of the present invention. FIG. 3 shows a cross section through the scannable mirror shown in FIG. 2.

Scanning mirror device 30 includes mirror assembly 22 and electrode unit 14. Mirror surface 24 is mounted on or deposited (e.g., as a deposited metal layer) on front surface 12a of gimbaled platform 12.

Although, in the example shown, mirror surface 24 and gimbaled platform 12 are shown as circular, other shapes are possible. The shape of electrodes 20 and other components of electrode unit 14 are shaped to correspond to, and cooperate with, gimbaled platform 12.

Figure 4:
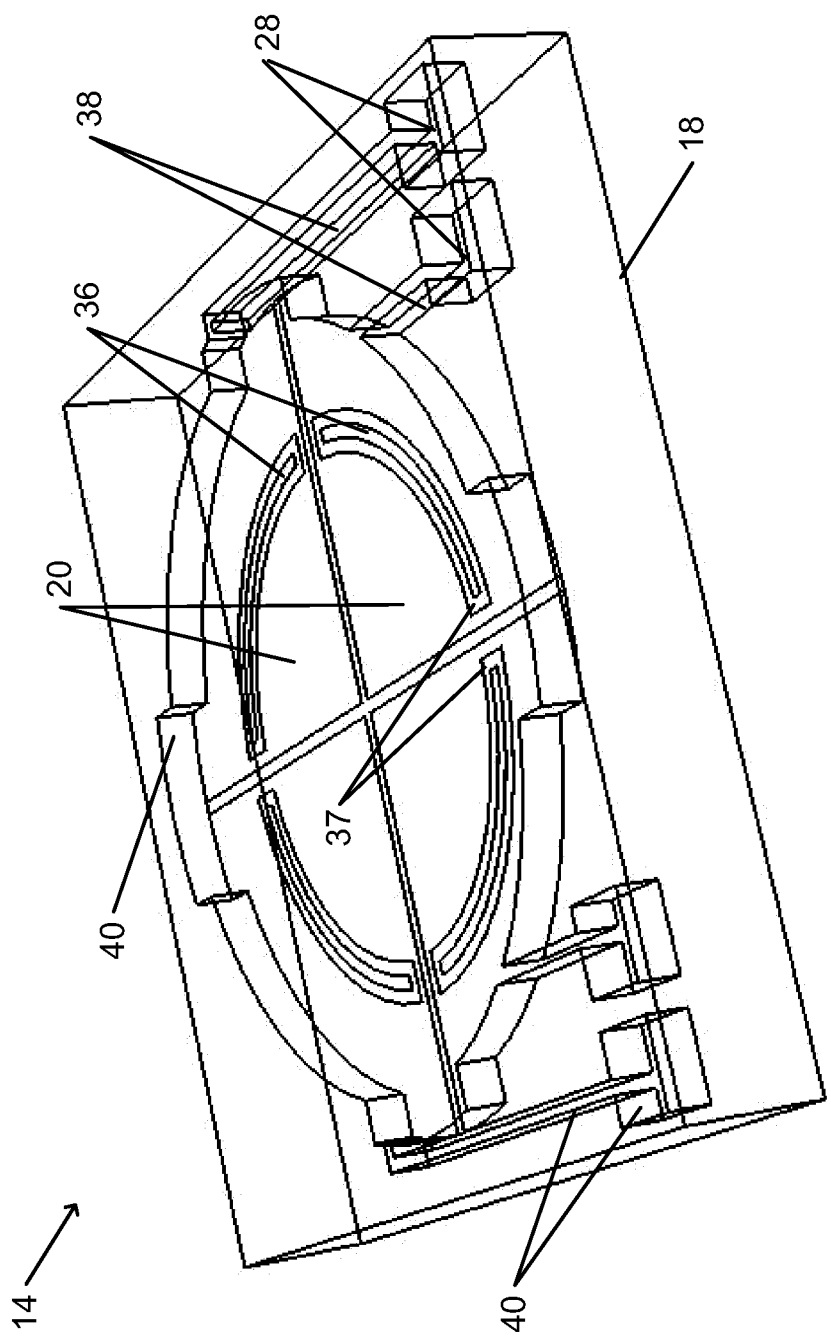
FIG. 4 shows an electrode unit of the scannable mirror shown in FIG. 2.

FIG. 4 shows an electrode unit of the scannable mirror shown in FIG. 2. As shown in FIGS. 2-4, electrode unit 14 includes an array of four electrodes 20 on electrode base 18. As shown, each electrode 20 is shaped in the form of a quadrant. An electrode unit having more than four electrodes, or fewer that four electrodes, is possible. Similarly, an electrode unit having another arrangement of electrodes, or having alternatively shaped electrodes, is possible. Typically, a configuration of an electrode array is designed to cooperate with a particular platform configuration or a particular mode of movement of the platform, or to achieve a desired control over movement of the platform.

Each electrode 20 is connected by a conductor 28 to a connector 28. Each connector 28 may be connected to a corresponding connector on one or more controller units. The controller unit may controllably apply an electric charge to electrode 20 via its corresponding connector 28.

Electrode base 18 may include an electrically insulating material such as glass. Conducting components, such as electrodes 20, conductors 28, or connectors 28, may include conducting material (e.g., metallic material) that is deposited within recessed regions 40. Recessed regions 40 may include trench-like or pit-like regions that are surrounded by electrically insulating material. Placement of conducting components within recessed regions 40 may reduce the risk of electrical breakdown (e.g., may increase the breakdown voltage).

Electrode unit 14 may include one or more electrically isolated regions, such as isolated pads 36. In accordance with other embodiments of the present invention, the isolated regions may include raised pillars. The isolated regions are configured to cooperate with corresponding structure on gimbaled platform 12. The isolated regions and the corresponding structure cooperate so as to limit the tilt of gimbaled platform 12. For example, isolated pads 36 may cooperate with pillars 34 on rear side 12b of gimbaled platform 12 to limit rotation of gimbaled platform 12.

In the configuration shown in FIG. 4, each isolated pad 36 is located within an electrode 20. The isolated pad 36 is separated from the surrounding electrode 20 by insulating border 37. For example, insulating border 37 may include a region of electrode base 18 that remains bare (e.g., no conducting material deposited on it). As another example, a layer of insulating material may be deposited to form insulating border 37. In accordance with other embodiments of the present invention, the isolated pads or structure may be located outside of the electrodes or between the electrodes.

As shown, each isolated pad 36 is shaped in the form of a narrow arc. Other shapes are possible. Typically, an isolated pad or structure on an electrode unit is shaped to match corresponding structure on the gimbaled platform.

Figure 5:
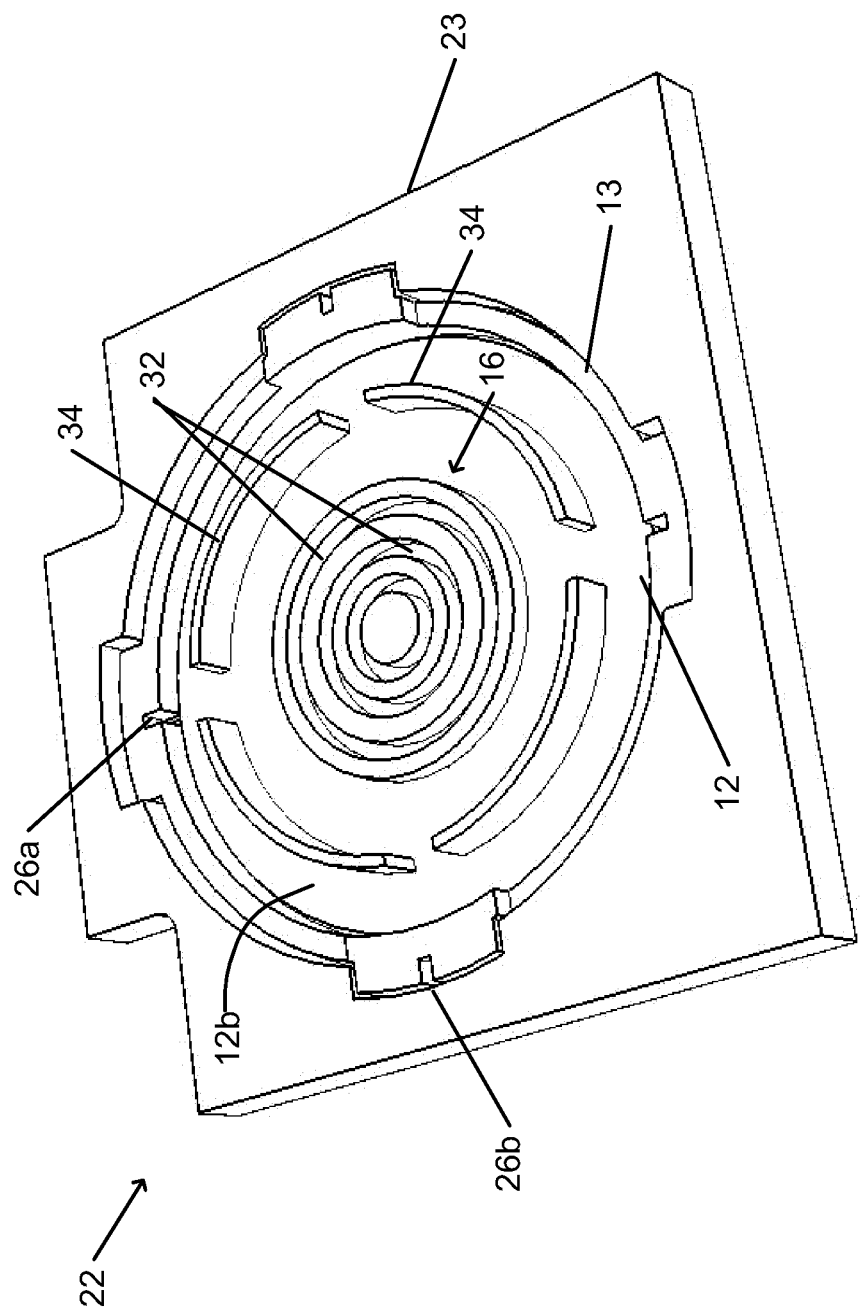
FIG. 5 shows a rear side of a mirror assembly of the scannable mirror shown in FIG. 2.

FIG. 5 shows a rear side of a mirror assembly of the scannable mirror shown in FIG. 2. As shown in FIGS. 2, 3, and 5, mirror assembly 22 includes gimbaled platform 12, which includes a mirror 24 on its front side 12a, mounted on mirror assembly base 23. The rear side of mirror assembly 22 faces electrode unit 14 when assembled into scanning mirror device 30.

As shown, gimbaled platform 12 is mounted within gimbal ring 13. Gimbaled platform 12 is rotatable about tilt axis 26a relative to gimbal ring 13. Gimbal ring 13, in turn, is rotatable about tilt axis 26b relative to mirror assembly base 23. Thus, gimbaled platform 12 is tiltable in two dimensions about orthogonal tilt axes 26a and 26b.

Tilt axes 26a and 26b may include a torsion bar that applies a restoring force that opposes tilting about tilt axis 26a or 26b. For example, various components or sections of gimbaled platform 12 (e.g., gimbal ring 13 and tilt axes 26a and 26b) may be created by an etching process or similar process that forms the components out of a block of material.

In accordance with other embodiments of the present invention, a gimbaled platform 12 may be tiltable in fewer than two dimensions (e.g., about a single axis), or about more than two axis (e.g., more than two non-orthogonal axes).

Central projection 16 extends outward from rear side 12b of gimbaled platform 12. As shown, central projection 16 is circular. In accordance with other embodiments of the present invention, a central projection may have another shape. For example, a shape of a central projection may correspond to the shape of the gimbaled platform from which the central projection extends.

Central projection 16 may be configured with one or more grooves 32. For example, configuring central projection 16 with grooves 32 reduce the mass of central projection 16 and gimbaled platform 12. Central projection 16 and gimbaled platform 12 may interact with an electrostatic field (e.g., as produced by electrodes 20) in the same manner (e.g., similar applied forces) as would a solid central projection with similar outer dimensions. Thus, the mass of central projection 16 with grooves 32 is less than that of a similarly sized solid central projection, but subject to similar applied electrostatic forces when placed in identical electrostatic fields.

As shown, grooves 32 are concentric. In accordance with other embodiments of the present invention, the grooves may be arranged in another symmetric or non-symmetric manner.

One or more pillars 34 extend from rear side 12b of gimbaled platform 12. For example, each pillar 34 may be positioned laterally to central projection 16. Each pillar 34 may extend further from rear side 12b of gimbaled platform 12 than central projection 16.

When mirror assembly 22 and electrode unit 14 are assembled into scanning mirror device 30, each pillar 34 on rear side 12b is positioned opposite a corresponding isolated pad 36 on electrode unit 14. The pillar 34 is shaped and positioned so as to contact its corresponding isolated pad 36 when gimbaled platform 12 is tilted toward that isolated pad 36. Thus, when gimbaled platform 12 tilts toward an isolated pad 36, the corresponding pillar 34 contacts that isolated pad 36 and further tilting of gimbaled platform 12 is prevented. When a pillar 34 contacts an isolated pad 36, no electrical contact is formed between gimbaled platform 12 and electrode unit 14. Thus, no snapdown condition is created.

The sizes and positions of pillars 34 and of isolated pads 36 are configured to stop tilting of gimbaled platform 12 at a modified maximum tilt angle. The modified maximum tilt angle is smaller than the snapdown angle for a particular configuration of scanning mirror device 30.

In the example shown, pillars 34 are located on rear side 12b of gimbaled platform 12, and isolated pads 36 are located on electrode unit 14. In accordance with other embodiments of the present invention, structure for limiting tilt may be otherwise configured. For example, isolated pillars may be located on electrode unit 14 and arranged to contact a raised or flat structure on the gimbaled platform 12. As another example, pillars may be located both on gimbaled platform 12 and on electrode unit 14.

In accordance with some embodiments of the present invention, an electrostatically steerable actuator or scanning mirror device may be produced using techniques adapted from MEMS technology.

For example, a gimbaled platform may be produced from a silicon-on-insulator (SOI) substrate using etching techniques. An electrode unit may be produced similarly from a borosilicate glass (e.g., Pyrex®).

FIG. 6A through FIG. 6J schematically illustrate stages of production of a scanning mirror device incorporating an electrostatically steerable actuator, in accordance with an embodiment of the present invention.

Figure 6A:
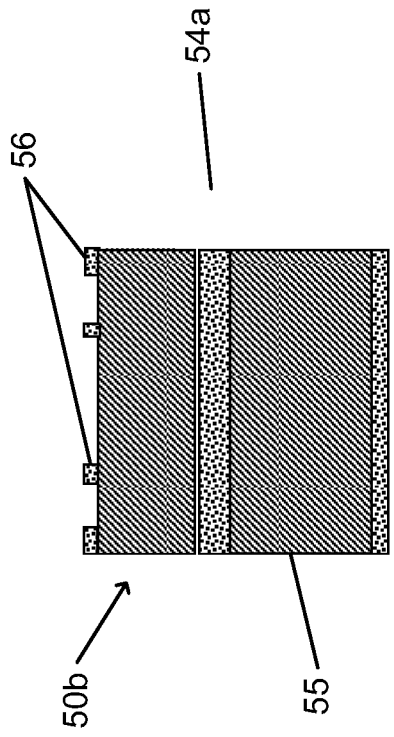

As schematically illustrated in FIG. 6A, an SOI substrate includes silicon layer 54a, silicon handle 55, and (insulator) thermal oxide (TOX) layers 52a, 52b, and 52c. For example, TOX layers 52a and 52c may have a thickness in the range of 0.3 µm to 2 µm. In some cases, TOX layers 52a and 52c may be about 1 µm thick. TOX layer 52b may have a thickness in the range of 0.5 µm to 2 µm. In some cases, TOX layer 52b may be about 2 µm thick. Silicon layer 54a may have a thickness in the range of 20 µm to 150 µm. In some cases, silicon layer 54a may be about 100 µm thick. Silicon handle 55 may have a thickness in the range of 300 µm to 500 µm. In some cases, silicon handle 55 may be about 400 µm thick.

Figure 6B:
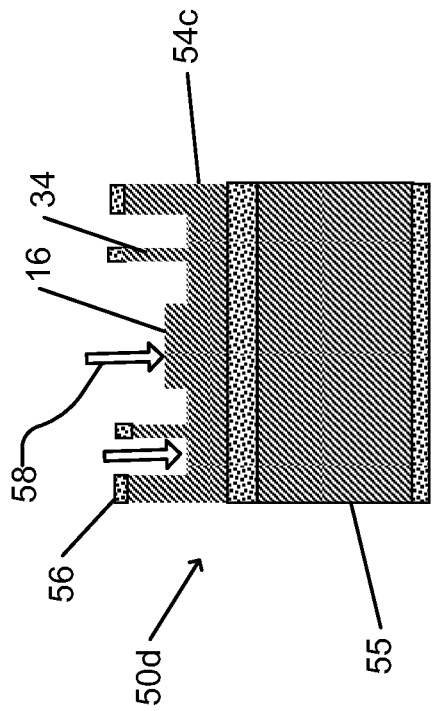

As schematically illustrated in FIG. 6B, hard mask 56 is formed from TOX layer 52a. For example, spin coating may be used to apply a photoresist to TOX layer 52a. Photolithography may be applied to shape the applied photoresist. Reactive-ion etching (RIE) may be applied to areas not covered by the photoresist to remove portions of TOX layer 52, thus forming hard mask 56. Remaining photoresist may then be removed.

Figure 6C:
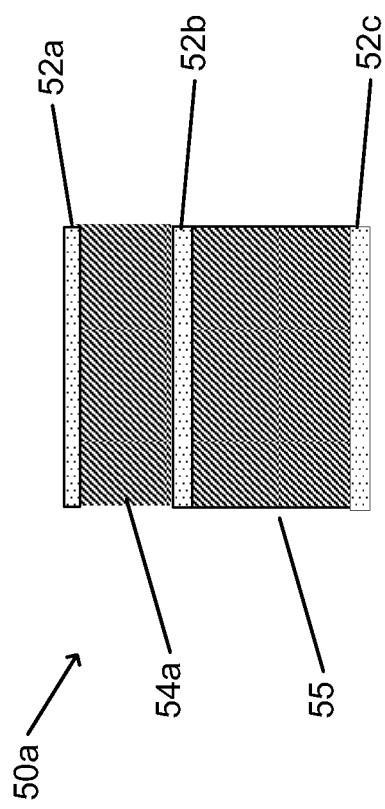

As schematically illustrated in FIG. 6C, deep reactive-ion etching (DRIE) 58 is used to remove part of silicon layer 54a to form etched silicon layer 54b. For example, spin coating may be used to apply a photoresist to silicon layer 54a. Photolithography may be applied to shape the applied photoresist. DRIE 58 may be applied to areas not covered by the photoresist to remove portions of silicon layer 54a, thus forming etched silicon layer 54b. Remaining photoresist may then be removed.

Figure 6D:
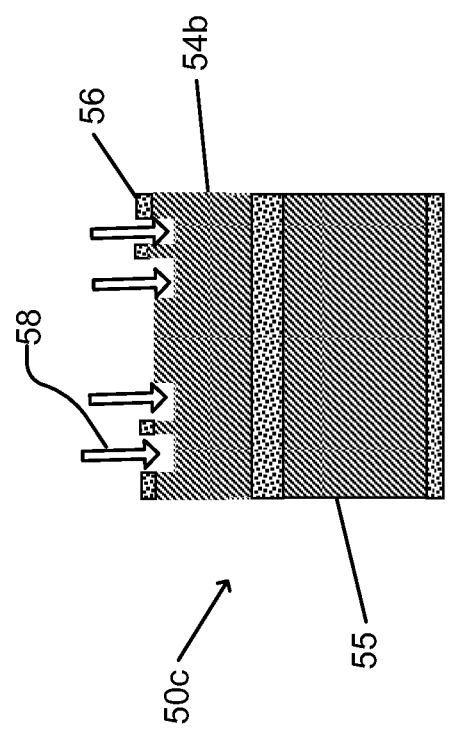

As schematically illustrated in FIG. 6D, in order to continue formation of deeper structure in etched silicon layer 54b, hard mask 56 is utilized. (Application of photoresist may not be practicable for etched portions of etched silicon layer 54b.) Thus DRIE 58 is applied using hard mask 56 to form shaped silicon layer 54c. For example, shaped silicon layer 54c may include central projection 16 and pillars 34. Hard mask 56 may then be removed from shaped silicon layer 54c.

(In accordance with some embodiments of the present invention, a pillar 34 may be made more accurately in a glass substrate, e.g., as discussed below in connection with FIG. 6E, using buffered hydrofluoric acid etching.)

As schematically illustrated in FIG. 6E, borosilicate glass blank 60 may be etched to form a recessed region 40. For example, spin coating may be used to apply a photoresist to a surface of borosilicate glass blank 60. Photolithography may be applied to shape the applied photoresist. A layer of chromium may be deposited (e.g., sputtered) onto the areas not covered by the photoresist. Buffered hydrofluoric acid (BHF) etching, typically very accurate, may be used to remove portions borosilicate glass blank 60 to form recessed region 40.

As schematically illustrated in FIG. 6F, electrodes 20 may be deposited in recessed regions 40 to form electrode unit 14. For example, spin coating may be used to apply a photoresist to a surface of recessed region 40. Photolithography may be applied to shape the applied photoresist. A layer of chromium and gold may be deposited (e.g., sputtered) onto the areas not covered by the photoresist to form electrodes 20 (or other conducting structure). Remaining photoresist, together with excess chromium and gold, may be removed.

As schematically illustrated in FIG. 6G, electrode unit 14 may be bonded (e.g., using anodic bonding) to shaped silicon layer 54c, thus forming assembly 62a.

As schematically illustrated in FIG. 6H, silicon handle 55 and TOX layer 52b may be removed to form assembly 62b. Assembly 62b may be inverted as schematically illustrated.

As schematically illustrated in FIG. 6I, shaped silicon layer 54c may be further etched to form gimbaled platform 12 or other structure of assembly 62c. For example, For example, spin coating may be used to apply a photoresist to shaped silicon layer 54c. Photolithography may be applied to shape the applied photoresist. DRIE 58 may be applied to areas not covered by the photoresist to remove portions of shaped silicon layer 54c. In this manner, gimbaled platform 12, and a gimbal ring or any additional structure, may be formed from shaped silicon layer 54c. (The etching may leave thin structure, not shown, to form torsion bars that support gimbaled platform 12.)

As schematically illustrated in FIG. 6J, front side 12a of gimbaled platform 12 may be metallized to form mirror surface 24. For example, shadow mask 66 may be positioned to cover parts of assembly 62c that are not to be metallized. Then, a metal (e.g., aluminum) may be deposited on front side 12a (e.g., using an aluminum evaporation process) to form mirror surface 24, and thus scanning mirror device 30.

Depending on the size of the components and the materials used, other processes may be utilized to form an electrostatically steerable actuator or a scanning mirror device.

The invention claimed is:

1. An electrostatically steerable actuator, the actuator comprising:
    a gimbaled platform, a central portion of a rear side of the platform extending outward from the platform, a diameter of the central portion being substantially smaller than a corresponding diameter of the platform, the platform including ridges that extend from the rear side of the platform; and
    an electrode unit, the electrode unit comprising:
        an array of electrodes facing the rear side of the platform to provide an adjustable electrostatic field to apply an electrostatic force on at least the central portion of the platform for tilting the platform; and
        electrically isolated pads, wherein each one of the electrically isolated pads is located within a respective one of the electrodes and is positioned to be contacted by a respective one of the ridges when the platform is tilted so as to limit tilting of the platform.

2. The actuator of claim 1, wherein a front surface of the platform comprises a mirror.

3. The actuator of claim 1, wherein the central portion is grooved.

4. The actuator of claim 1, wherein the platform and central portion are substantially circular.

5. The actuator of claim 4, wherein the diameter of the central portion is within a range of diameters equal to 40% to 60% of the diameter of the platform.

6. The actuator of claim 5, wherein the diameter of the central portion is substantially equal to half the diameter of the platform.

7. The actuator of claim 1, wherein the electrode array comprises four electrodes.

8. The actuator of claim 7, wherein the electrode array is circular and each electrode of the electrode array is substantially quadrant shaped.

9. The actuator of claim 1, wherein the electrode array is located on a glass substrate.

10. The actuator of claim 9, wherein a conductor of the electrode array is located within a recessed region.

11. The actuator of claim 1, wherein the platform is connected to supporting structure via a torsion bar.

12. The actuator of claim 1, comprising a gimbal ring surrounding the platform.

13. The actuator of claim 1, wherein the gimbaled platform and the central portion are constructed from a single piece of a material.

14. The actuator of claim 13, wherein the material comprises silicon.

* * * * *